United States Patent [19]
Lang

[11] Patent Number: 5,217,329
[45] Date of Patent: Jun. 8, 1993

[54] PNEUMATIC TUBE CONVEYOR STATION

[75] Inventor: Hartmut Lang, Plochingen, Fed. Rep. of Germany

[73] Assignee: infotronic Vertriebsgesellschaft fuer Kommunikationssysteme mbh, Plochingen, Fed. Rep. of Germany

[21] Appl. No.: 761,638

[22] Filed: Sep. 18, 1991

[51] Int. Cl.$^5$ .................. B65G 51/30; B65G 51/20
[52] U.S. Cl. .................. 406/176; 406/179; 406/52; 406/82; 406/84
[58] Field of Search ............... 406/110, 112, 62, 66, 406/82-84, 52, 176-180

[56] References Cited

U.S. PATENT DOCUMENTS

| | | | |
|---|---|---|---|
| 588,948 | 8/1897 | Bostedo | 406/180 |
| 1,112,304 | 9/1914 | Loebenberg | 406/110 |
| 1,923,052 | 8/1933 | Churlstrom | 406/176 |
| 2,135,355 | 11/1938 | Scanlan | 406/177 X |
| 2,761,633 | 9/1956 | Sindzinski | 406/83 X |
| 3,042,454 | 7/1962 | Eissmann et al. | 406/82 X |
| 4,437,797 | 3/1984 | Kardinal | 406/63 X |

FOREIGN PATENT DOCUMENTS

| | | | |
|---|---|---|---|
| 700289 | 12/1964 | Canada | 406/110 |
| 264635 | 11/1927 | Fed. Rep. of Germany | 406/62 |
| 585137 | 9/1933 | Fed. Rep. of Germany | 406/62 |
| 1801103 | 10/1968 | Fed. Rep. of Germany | . |
| 1916784 | 10/1969 | Fed. Rep. of Germany | 406/84 |
| 2400131 | 10/1975 | Fed. Rep. of Germany | 406/110 |
| 3211099 | 10/1983 | Fed. Rep. of Germany | 406/31 |
| 3435500 | 9/1984 | Fed. Rep. of Germany | . |
| 3801558 | 8/1989 | Fed. Rep. of Germany | 406/110 |
| 3817949 | 11/1989 | Fed. Rep. of Germany | 406/112 |
| 1412733 | 8/1965 | France | 406/110 |
| 2024354 | 11/1969 | France | . |

*Primary Examiner*—Russell D. Stormer
*Assistant Examiner*—James M. Kannofsky
*Attorney, Agent, or Firm*—Porter, Wright, Morris & Arthur

[57] ABSTRACT

A pneumatic tube conveyor station serves for receiving conveying cases (12) arriving from a forwarding tube (11) and having a high weight of, for example, 12 kg and a high travelling speed of, for example, 7 m/s. The conveying cases (12) are initially braked in a rotatable intermediate store (15) and are then transferred, after the intermediate store (15) has been rotated, to a unloading position (56). The intermediate store (15) is arranged in a position above the forwarding tube (11) and the unloading position (56). The intermediate store (15) and the unloading position (56) are connected one with the other by a substantially vertical tube section (40, 41, 55).

7 Claims, 1 Drawing Sheet

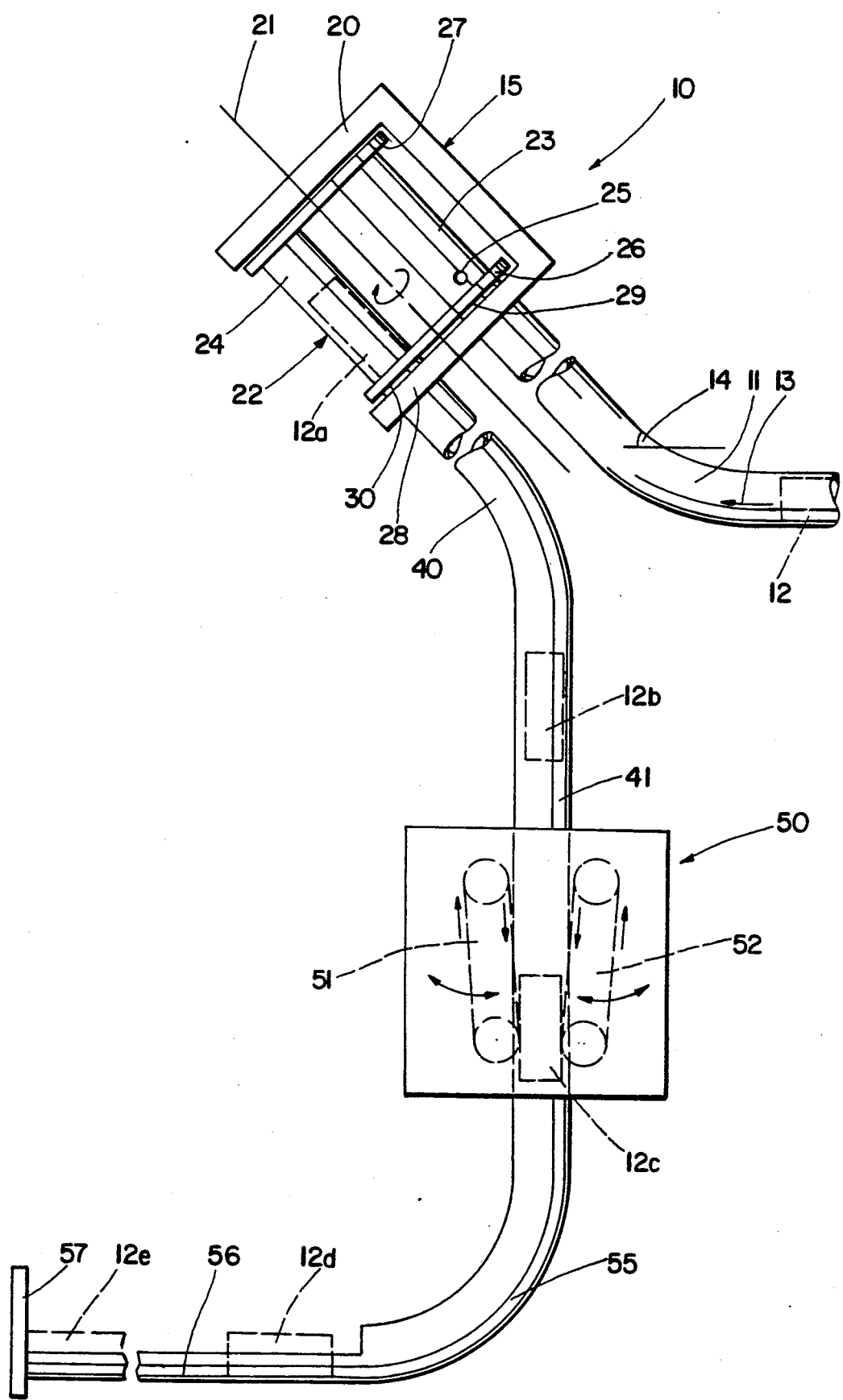

PNEUMATIC TUBE CONVEYOR STATION

The present invention relates to a pneumatic tube conveyor station for conveying cases arriving from a forwarding tube, where the conveying cases are initially fed into a rotatable intermediate store and are then transferred by gravity, after the intermediate store has been rotated, to an unloading position arranged below the intermediate store, the latter being designed as a rotor comprising a plurality of tube sections which can be aligned selectively with the forwarding tube and/or a tube connected to an unloading position by suitable rotation of the rotor.

A pneumatic tube conveyor station of the described type has been known from German Disclosure Document No. 30 09 345.

It has been known before in pneumatic tube conveyor technology to equip dispatching and/or receiving stations for conveying cases with a rotor containing one or more tube sections adapted for receiving one conveying case at a time. While some embodiments of such pneumatic tube conveyor stations, for example the one described by German Patent Specification No. 33 29 635, provide for rotation of the rotor about an axis perpendicular to the longitudinal center axis of the tube section, others, including the one described by the beforementioned German Disclosure Document No. 30 09 345, propose a rotor designed in the manner of a revolving magazine rotating about an axis extending substantially in parallel to the longitudinal center axis of the tube section.

In both cases the rotor can be rotated in operation in such a way that one of the tube sections is brought into alignment with the forwarding tube so that the arriving conveying case is caused to enter the respective tube section of the rotor.

It has been known in this connection from German Patent Specification No. 33 29 635 to select the arrangement in such a way that the end of the tube section opposite the forwarding tube is closed air-tight in this position of the rotor so that the conveying case, which arrives at high speed, is braked pneumatically by an air cushion. This requires, however, that some air outlet must be provided in the arriving forwarding tube, a short way before the station, so as to permit the conveying case to enter the station and to ensure that the air cushion will develop in the tube only between the air outlet and the closed end of the tube section.

When feeding the conveying case into the system from below, as proposed by German Disclosure Document No. 30 09 345, no air cushion can develop inside the tube section of the rotor above the conveying case because this tube section must be open on top in order to permit the conveying case to enter the rotor from below, and the air pushed along by the conveying case to escape at the top of the tube. This means that a mechanical stop, which must be permeable to air, must be provided in this case for trapping the conveying case, which latter then hits the stop from below at full speed. This is uncritical in the case of the known pneumatic tube conveyor station because the conveying case entering the system from below is relatively light in weight and is anyway travelling in an upward direction at reduced speed.

For discharging the conveying case, the rotor is then rotated from the receiving position adjacent to the forwarding tube just described, into a discharging position adjacent to the tube connected to the unloading position in which normally that end, which previously occupied the position opposite the forwarding tube, comes to lie above an opening through which the conveying case can drop into a collecting basket.

Now, in modern applications of pneumatic tube conveyor systems there is sometimes a demand for systems which are not suited only for conveying papers or other goods of relatively light weight. Rather, goods transported in today's pneumatic tube conveyor systems sometimes make the conveying cases rather heavy. A typical application of such systems is in materials handling in assembly shops of machine manufacturers where machine elements or assembly supplies, for example, i.e. metallic workpieces or articles, are to be transported by pneumatic tube conveyor systems over distances of up to some hundred meters or even more. The conveying cases used in such pneumatic tube conveyor systems may reach a weight of between 10 and 20 kg, and the travelling speeds are in the range of between 5 and 10 m/s in order to ensure rapid delivery of the materials over the described distances. Based on the data given above, this means that the travelling conveying cases may reach kinetic energies of 300 Newton-meters and above, and it must in addition be considered in this connection that the friction losses of the travelling conveying cases are constantly compensated for by the compressed-air drive.

Now, in operation of the pneumatic tube conveyor system various malfunctions may occur in the area of a receiving pneumatic tube conveyor station. For example, it may happen that a second conveying case arrives while a first conveying case is still being received and unloaded, in which case the incoming conveying case may hit the pneumatic tube conveyor station in any position. This is not necessarily a problem with conventional pneumatic tube conveyor systems using conveying cases of relatively low weight, because here the second incoming conveying case will normally be trapped at or in the station and will then be the next to be discharged.

Moreover, as has been mentioned before, it is usual with conventional pneumatic tube conveyor stations that the incoming conveying cases, as they leave the rotor of the receiving pneumatic tube conveyor station, drop into a collecting basket. This, too, is relatively uncritical for conventional systems using conveying cases of relatively low weight since in the case of a height of fall of, say, 1 m even a plurality of conveying cases may drop into the collecting basket in succession without causing any inconvenience. And as a rule, there is also no risk for the user of the receiving pneumatic tube conveyor station, if the user should reach into the collecting basket in order to remove a conveying case from the basket just at the moment when another arriving conveying case leaves the rotor and drops into the collecting basket.

All these operating conditions, which are rather unproblematic with conventional pneumatic tube conveyor systems, may however lead to critical situations when conveying cases of high weight are transported at high speeds.

For, if in such a case a conveying case arriving through the forwarding tube at high speed should arrive at the receiving station just at the moment when the latter is in an undefined operating condition, handling a conveying case that has arrived a short time before, this may lead to complete destruction of the pneumatic tube conveyor station, given the kinetic energies that have been described above.

It has been known in connection with terminals of pneumatic tube conveyor systems to provide links with revolving conveyor belts which swing from both sides into the path of the conveying cases in order to brake the latter and to move them on thereafter at a controlled speed. Arrangements of this type have been known, for example, from German Disclosure Document No. 32 39 561 where conveying cases are discharged in this manner from the pneumatic tube conveyor station to the top. However, these known conveyor systems in terminals of pneumatic tube conveyor systems are by no means suited to absorb the considerable kinetic energy encountered with heavy conveying cases of the type described above.

In addition, it is also not possible with conveying cases of such a high weight to have them drop into a collecting basket over a height of fall of 1 m because conveying cases dropping one on top of the other would damage each other, quite apart from the considerable noise level that would be developed in this case.

Finally, considerable risks would exist for the users of the receiving station if they should reach into a collecting basket in order to remove a conveying case just at the moment when another conveying case drops from the rotor into the basket. If in such a case several unlucky circumstances should coincide, this may then result in injuries.

Now, it is the object of the present invention to improve a pneumatic tube conveyor station of the type described above in such a way that conveying case of high weight can also be received in a safe manner without any risk of damage to the pneumatic tube conveyor station in the event malfunctions should occur, that the arriving heavy conveying cases are unloaded without developing much noise and that, finally, any risk for the persons involved in the handling can be excluded.

The invention achieves this object by the fact that the intermediate store and the unloading position are connected one with the other by a substantially vertical tube section and that a low-pressure condition is induced in the tube section above the conveying case travelling to the unloading position in a downward direction.

This solves the object underlying the present invention fully and perfectly.

By positioning the intermediate store above the forwarding tube, the invention provides the advantage that a heavy conveying case arriving at high speed is braked pneumatically by an air cushion so that it will enter the intermediate store at considerably reduced speed. Depending on the number of storing positions in the intermediate store, a plurality of arriving conveying cases can be received in rapid succession, without thereby disturbing the subsequent unloading of the conveying cases. This is so because when the rotor has been turned in order to bring the conveying case that arrived first into alignment with the tube connected to the unloading position, another empty tube section is brought into alignment immediately with the forwarding tube. Locating the unloading position below the intermediate store then provides the advantage that the conveying case will arrive at the unloading position at relatively low speed, without being driven by air, because a low-pressure condition exists in the tube section of the rotor above the conveying case, and also in the following substantially vertical tube, which low pressure acts to pneumatically brake the conveying case on its way down. Further, it is an advantage of this arrangement that the tube between the intermediate store and the unloading position offers the most varied possibilities to control in a suitable manner the speed at which the conveying case arrives at the unloading position, due to the friction in the tube and by means of other, additional measures.

According to a particularly preferred embodiment of the invention, the forwarding tube end of each tube section of the intermediate store is provided with a non-return valve which assumes its open position when overpressure prevails in the tube section, and its closed position in the presence of low pressure.

This feature offers the advantageous possibility, which can be realized by particularly simple constructional means, that as the conveying case enters the intermediate store, an air cushion is produced in front of it, while on the other hand, when the conveying case leaves the intermediate store, the desired low pressure develops as the valve closes. This is so because the air column which is pushed along by the conveying case entering the store, can escape through the valve until the conveying case has passed the valve, whereas the remaining air column left in front of the conveying case entering the store cannot escape any more so that it serves as an air cushion for braking the conveying case. On the other hand, when the conveying case leaves the store in a downward direction, the low-pressure condition develops immediately because the valve closes at once after it has been passed by the conveying case, the air column now existing behind the conveying case being extended, whereby a low pressure condition develops which causes the valve to close at once.

According to a preferred further development of the pneumatic tube conveyor station according to the invention, the intermediate store is designed, in the conventional manner, as a rotor comprising a plurality of tube sections which can be brought into alignment selectively with the forwarding tube and a tube connected to the unloading position, by suitable rotation of the rotor.

This feature provides the advantage that, depending on the number of tube sections provided in the intermediate store, almost any desired number of conveying cases can be stored temporarily and can then be fed to the unloading position one by one.

In connection with this arrangement, it is particularly preferred if the rotor is inclined relative to the forwarding tube by an angle of between 30° and 90°, preferably 45°.

These design relationships provide the advantage that in spite of moderate space requirements, a sufficient height of rise is ensured for the conveying case from the forwarding tube to the intermediate store in order to convert the kinetic energy of the moving conveying case to the potential energy of the conveying case which is stored at a higher level.

According to other preferred further developments of the invention, the forwarding tube is tightly closed at the rotor in any intermediate position of the rotor.

This feature provides the advantage that the speed of the arriving conveying case can be further reduced by braking it by an air cushion before it enters the intermediate store.

Another group of embodiments of the invention provide that a braking station is arranged between the intermediate store and the unloading position.

This feature offers the advantage that the discharging speed of the conveying case can be reduced to any desired value because the conveying case can be slowed down sufficiently by the braking station even in the presence of a large difference in height between the intermediate store and the unloading position.

According to a further development of this embodiment of the invention, the braking station is provided, in a manner known as such, with oppositely directed links of driven brake bands which can be applied to either side of the conveying case.

This feature offers the advantage that the conveying case arriving at the braking station enters the space between the brake bands which are inclined relative to each other in V shape so that the conveying case is braked and then discharged at the much lower speed of the driven brake bands. In addition, this arrangement acts to separate the conveying cases so that they reach the unloading position one by one.

Finally, another embodiment of the invention is particularly preferred where the unloading position is designed as a horizontal track which is connected to the substantially vertical tube.

It is the advantage of this feature that the conveying cases are finally received in the horizontal track in orderly succession, and can then be removed in radial direction, without there being any risk for the user of the pneumatic tube conveyor station, even if another conveying case should enter the horizontal track just at that moment.

All in all, the invention therefore provides the substantial advantage that the conveying cases travel at low speed in the area where they are handled, so that even in the event several such conveying cases should arrive in rapid succession, due to some malfunction of the system, no damage can be caused to the system because the system allows for conveying cases to line up at different positions of the station, and finally there does not exist any risk of injury for the user of the system.

Other advantages of the invention will appear from the specification and the attached drawing.

It is understood that the features that have been described before and will be explained hereafter may be used not only in the described combinations, but also in any other combination, or individually, without departing from the scope and intent of the present invention.

Certain embodiments of the invention will now be described in more detail with reference to the sole drawing which shows a diagrammatic side view of one embodiment of a pneumatic tube conveyor station according to the invention.

Regarding now the FIGURE, a pneumatic tube conveyor station is indicated generally by reference numeral 10. A forwarding tube 11 extends substantially in a horizontal direction, for example below the ceiling or halfway between the floor and the ceiling of a factory or assembly shop. The forwarding tube 11 serves for forwarding the conveying case 12, the conveying case 12 of interest in the present case having a relatively high weight of, say, 12 kg and travelling at speeds of 7 m/s, for example.

In the representation of the FIGURE, the conveying case 12 arrives in the forwarding tube 11 from the right, as indicated by the arrow 13 pointing to the left.

Shortly before the forwarding tube 11 enters the pneumatic tube conveyor station 10, the forwarding tube 11 turns in an upward direction at an angle 14 of between 30° and 90°, preferably 45°.

Following a rising section of a length that can be determined according to the requirements of the particular case, the upwardly directed section of the forwarding tube 11 then enters an intermediate store indicated generally by 15.

The intermediate store 15 comprises a stationary frame 20 in which a rotor 22 is mounted to rotate about an axis 21. The axis 21 extends at the same angle 14 relative to the horizontal line.

In the case of the embodiment illustrated in the figure, the rotor 22 comprises two tube sections 23 and 24 extending in parallel one to the other and to the axis 21. However, it is understood that instead of providing two tube sections 23, 24, it is also possible to arrange three or more tube sections in spaced arrangement about the axis 21, and it is likewise understood that the tube sections 23, 24 need not necessarily be straight but may just as well be curved.

The tube sections 23, 24 may be equipped with non-return valves 25 in the manner known as such. The non-return valves 25 are designed in such a way that in the presence of an overpressure in the tube sections 23, 24, they assume their open positions and permit the air to flow off, while in the presence of low-pressure conditions in the tube sections 23, 24, they will close in order to exclude any inflow of air. The non-return valves 25 are arranged in the tube sections 23, 24 in the immediate neighborhood of the lower end plate 26.

The tube sections 23, 24 are held at their ends by end plates 26, 27 extending in a radial direction relative to the axis 21. The lower end plate 26—as viewed in the figure—is positioned opposite a counterplate 28 of the frame 20. The end plate 26 and the counterplate 28 are provided with passage openings so that in the position of the rotor 22 illustrated in the figure, a conveying case 12 can enter the tube section 23 via the forwarding tube 11, through the end plate 26 and the counterplate 28, while a conveying case 12a can leave the system via the tube section 24, through the end plate 26 and the counterplate 28 and through the intermediate store 15 in a downward direction, as will be discussed in more detail further below.

Between the end plate 26 and the counterplate 28, sliding seals 29, 30 are provided in the passage area for the conveying case 12, which seals on the one hand serve to connect the tube sections 23, 24 in pressure-tight relationship to the respective adjoining forwarding and substantially vertical tubes 11, 40, and on the other hand ensure a pressure-tight closure, for example for the upper end of the forwarding tube 11, whenever the rotor 22 occupies an intermediate position.

The substantially vertical tube is designed as an inclined tube section 40, which is connected to the bottom of the intermediate store 15 at the point where the tube section 24 can be seen in the figure, followed by a curved section and then by a vertical tube section 41. At the lower end of this vertical tube section 41, there is located a braking and separating station 50. This braking and separating station 50 comprises two links 51, 52 carrying driven brake bands on their circumference. As indicated by arrows in the station 50, the links 51, 52 can swing through the station 50 either into the travelling path of the conveying case 12c, or clear of this travelling path.

The braking and separating station 50 finally is followed by a downwardly directed curved tube section 55 terminating by an unloading position 56. The tube is open in the area of the unloading position 56, and is limited only at its end by a stop 57.

The function of the station 10 is as follows:

The conveying case 12 arriving from the forwarding tube 11 from the right has a certain kinetic energy, depending on its travelling speed and mass. By changing the direction of the arriving conveying case 12 and guiding it along the tube section which rises at the described angle 14, the kinetic energy is converted more and more to potential energy, accompanied by a reduction in speed. If the rotor 22 of the intermediate store 15 occupies a defined receiving position, the conveying case 12 is permitted to enter the first tube section 23, for example, immediately. The conveying case is then braked at the upper end of the tube section 23 by the air cushion which builds up below the upper end plate 27. The conveying case 12 approaching the intermediate store 15 in the forwarding tube 12 pushes an air column along the tube before itself. This air column causes an overpressure to build up in the tube section 23, with the consequence that the non-return valve 25 switches to its open position and the air before the conveying case 12 is permitted to escape. Now, once the conveying case 12 has passed the non-return valve 25, the short air column still remaining in front of the conveying case 12, i.e. the air column between the conveying case 12 and the upper end plate 27, can no longer escape with the consequence that the conveying case 12 is braked down and stopped smoothly. This is the more so as the heavy conveying case 12 is no longer driven on this last part of its travel so that its movement is stopped by its own weight.

Once the arriving conveying case 12 has entered the rotor 22, which fact is detected by suitable sensors or limit switches, the rotor 22 is rotated, and the arriving conveying case 12 is "trapped".

The conveying case 12, having now come to a standstill, is rotated by turning the rotor 22 into that position which the conveying case 12a occupies in the illustration. The conveying case 12a can now slide down from the respective tube section of the intermediate store and into the substantially vertical tube.

Once the conveying case 12a has left the tube section in a downward direction, a low-pressure condition develops in the tube section above the conveying case which could be balanced only by unavoidable leakage currents flowing past the circumferential seals of the conveying case 12a. As the conveying case 12a moves down under the effect of gravity, the air column at its back increases constantly, and the pressure cannot be balanced in this case by the conveying case 12a passing the non-return valve 25, the latter being closed due to the low pressure prevailing in the tube section. As a result of this, the downward travel of the conveying case 12a is braked pneumatically in a very efficient way so that even a very heavy conveying case 12a will slide down only very slowly.

The conveying case 12a, being guided via the inclined tube section 40 and the vertical tube section 41, then reaches the position of conveying case 12b and enters subsequently the braking and separating station 50 where it is guided between the links 51, 52 which open resiliently in the form of a V and which act to brake them down again almost to a fully stopped condition. The brake bands of the links 51, 52 move in a downward direction in the area of engagement of the vertical tube section so that the conveying case is transported further down, as indicated by conveying case 12c, at slow speed, namely at the adjustable speed of the brake bands.

Finally, the conveying case 12c leaves the braking and separating station 50 in a downward direction, passes the curved tube section 55, and reaches, at extremely low speed, the unloading position 56 where it can be picked up and removed.

Now, in the event a malfunction should occur which should cause a conveying case 12 to enter the forwarding tube at high speed, although the rotor 22 does not occupy its receiving position, then the conveying case 12 to arrive next will be braked by an air cushion building up at this moment in the forwarding tube 11 before the first end plate 26. Only when the rotor 22 has been discharged fully or in part in the envisaged way, and when an empty tube section 23 is positioned in alignment with the forwarding tube 11, will the arriving conveying case be permitted to enter the rotor 22. This then proceeds at very low speed, because the additional arriving conveying case has been braked by an air cushion, as mentioned before.

The second and any subsequent conveying cases can now be discharged into the inclined tube section 40, by suitable rotation of the rotor 22, and this even if any preceding conveying case or cases should not all have been transferred from the braking and separating station 50 to the unloading position 56. Consequently, it is absolutely possible that a queue of several arriving conveying cases 12b may build up above the braking and separating station 50, without this impairing the function of the pneumatic tube conveyor station 10. This is so because all that would again happen at low speeds, and because the braking and separating station 50 is capable of passing through a plurality of conveying cases 12b, 12c one by one.

In any case, the conveying cases 12c, 12d will leave the braking and separating station 50 one by one because the brake bands of the links 51, 52 will come to engage a subsequent conveying case only after the end of the preceding conveying case has been released and because the whole conveying case has to be passed through before the next one can be engaged.

Given the fact that the conveying cases 12c leave the braking and separating station at extremely low speed, they also travel at very low speed through the curved tube section 55 and upon the unloading position 56 where they come to rest sequentially at or before the stop 57 as indicated by conveying cases 12e, 12d so that they can be removed by the user without any problem.

I claim:

1. A pneumatic tube conveyor station, comprising:
   a pneumatic conveyor forwarding tube, said forwarding tube interconnecting said station with other pneumatic tube conveyor stations;
   an unloading position for unloading pneumatic tube conveying cases having arrived through said forwarding tube;
   a substantially vertical tube connected to said unloading position;
   intermediate store means arranged between said forwarding tube and said substantially vertical tube, said intermediate store means comprising a plurality of tube sections, means for rotating said intermediate store means about an axis, and means for selectively bringing a predetermined one of said tube sections into alignment with and for maintaining for a predetermined period of time said predetermined one of said tube sections in said alignment with either said forwarding tube or said substantially vertical tube, said intermediate store means being arranged above said forwarding tube and said substantially vertical tube; and sealing means interposed between said substantially vertical tube and a tube section of said intermediate store means for maintaining therein the reduced pressure induced above a conveying case by the travel of said conveying case in said tube section and said substantially vertical tube under the action of gravity.

2. The station of claim 1 wherein said unloading position comprises a horizontal track connected to said substantially vertical tube.

3. The station of claim 1 wherein said substantially vertical tube comprises a braking station.

4. The station of claim 3 wherein said braking station comprises oppositely directed links of driving brake bands adapted for application to either side of a transiting conveying case.

5. The station of claim 1 wherein said tube section comprises a non-return valve located in the end of said tube section adjacent to said forwarding tube, said non-return valve opening under the action of overpressure within said tube section and closing under the action of reduced pressure therein.

6. The station of claim 5 wherein said intermediate store means is arranged with its axis of rotation being inclined by an angle of between 30° and 90°, preferably of 45°, relative to a longitudinal axis of said forwarding tube.

7. The station of claim 5 wherein said forwarding tube is tightly sealed with respect to said intermediate store means when said intermediate store means is in an intermediate position of rotation.

* * * * *